Figure 8:
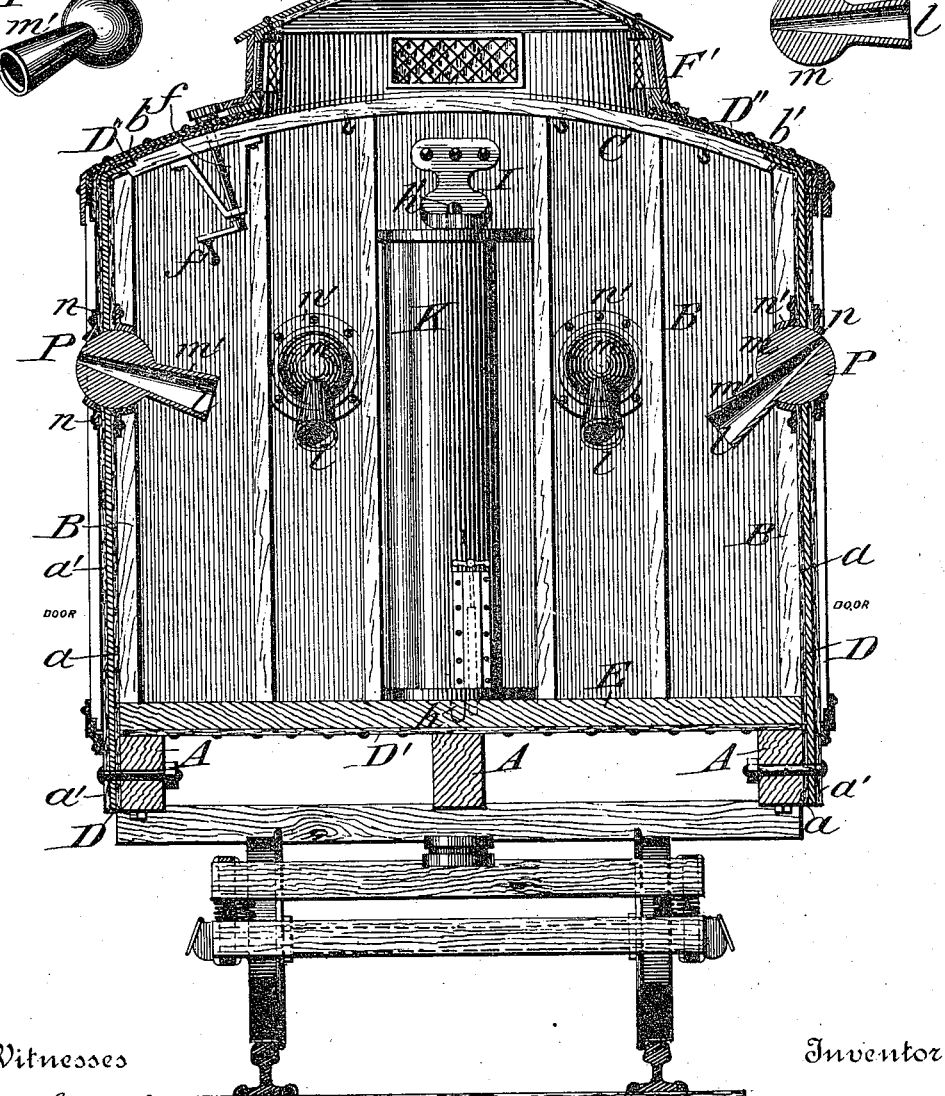

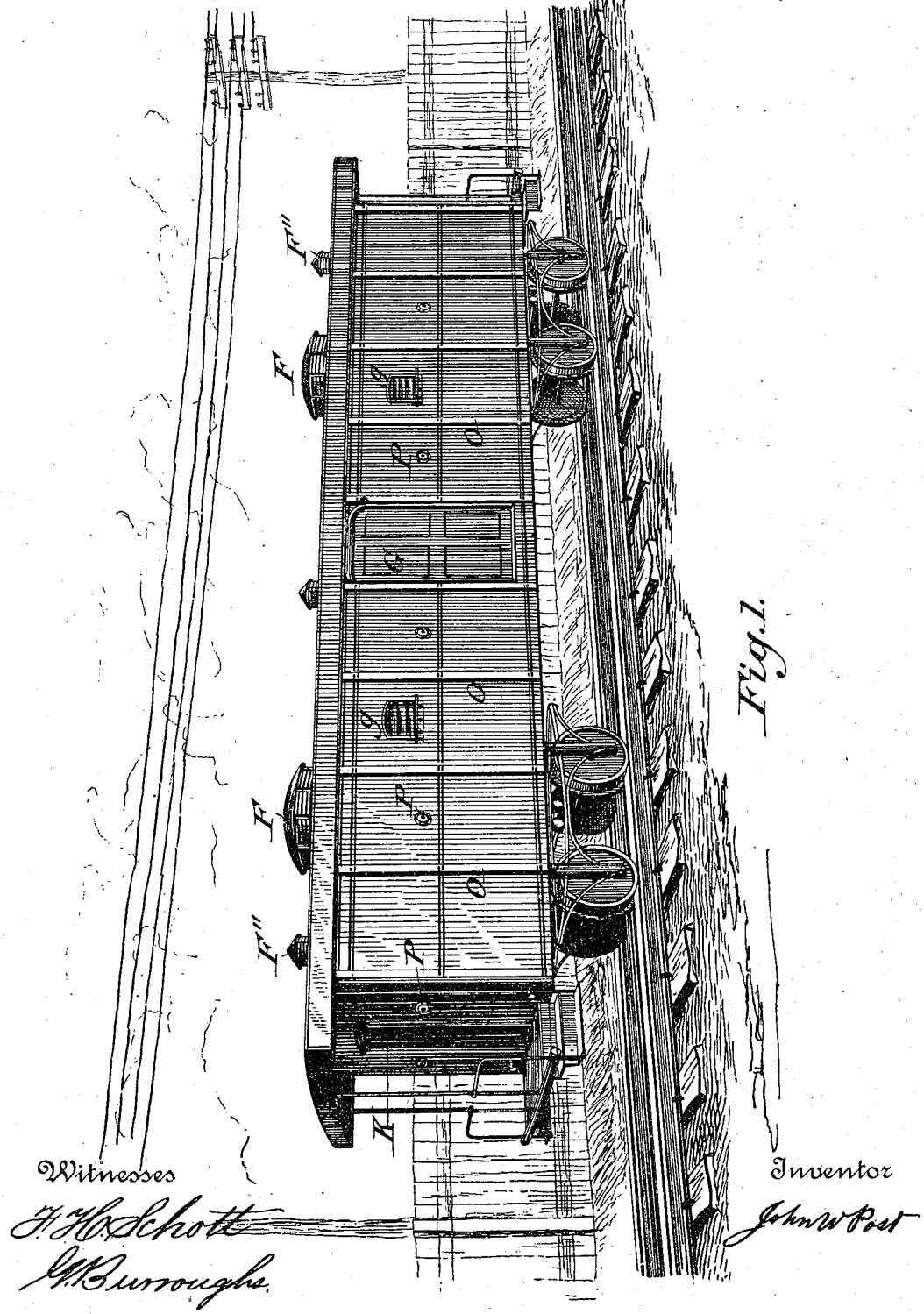

(No Model.) 7 Sheets—Sheet 2.
J. W. POST.
EXPRESS CAR.
No. 377,774. Patented Feb. 14, 1888.
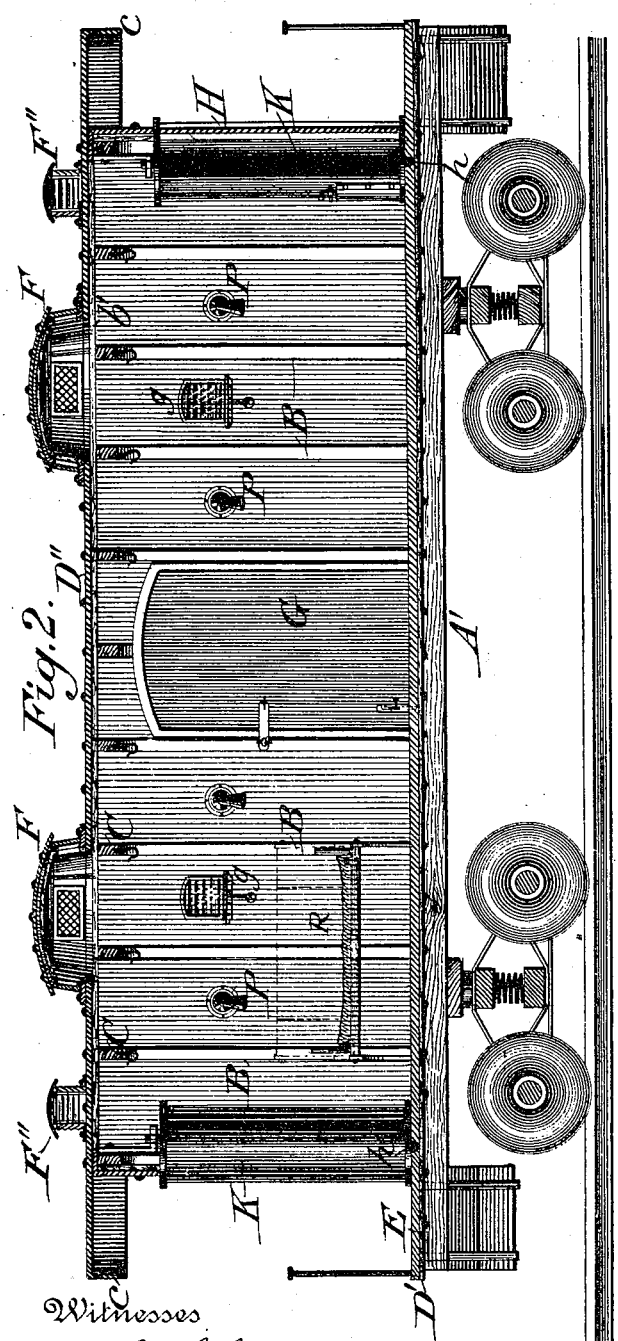
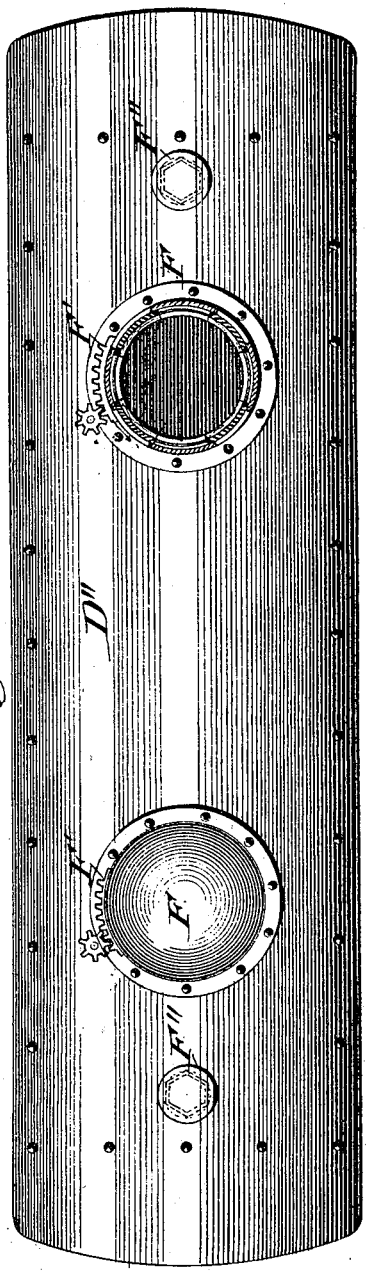
Witnesses
F. H. Schott.
G. Burroughs.
Inventor
John W. Post.

(No Model.) 7 Sheets—Sheet 3.
J. W. POST.
EXPRESS CAR.
No. 377,774. Patented Feb. 14, 1888.
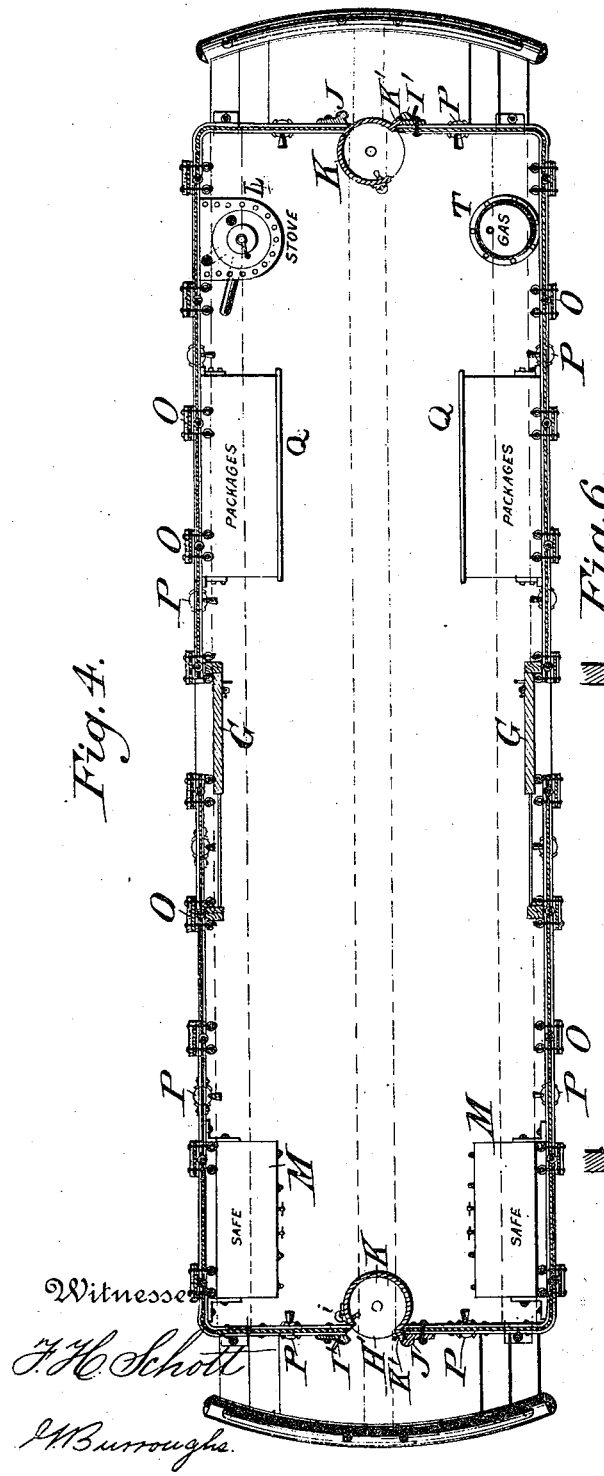
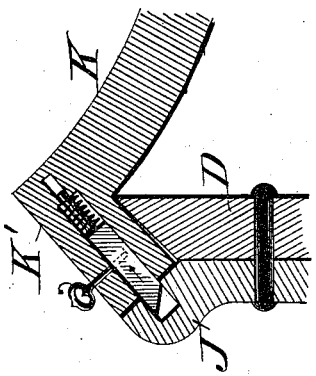
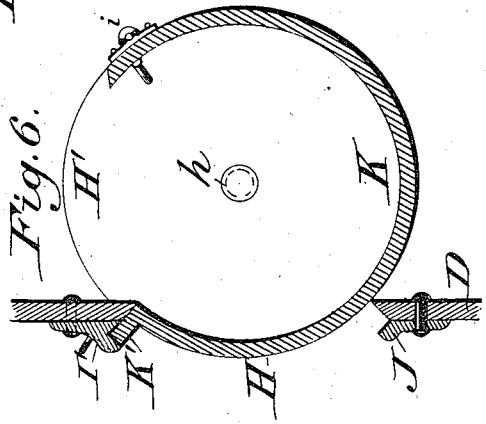
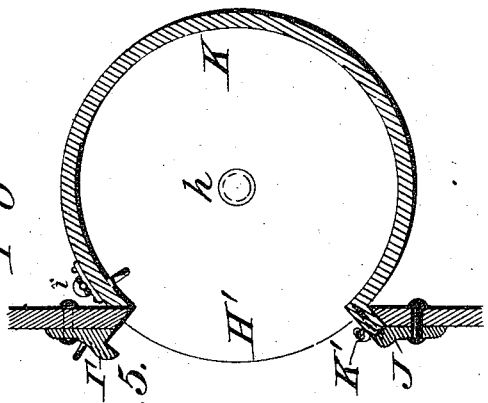
Witnesses
F. H. Schott
J. W. Burroughs.
Inventor
John W. Post.

(No Model.) 7 Sheets—Sheet 4.
J. W. POST.
EXPRESS CAR.

No. 377,774. Patented Feb. 14, 1888.

Witnesses
F. H. Schott
G. Burroughs

Inventor
John W. Post (No Model.) 7 Sheets—Sheet 5.
J. W. POST.
EXPRESS CAR.
No. 377,774. Patented Feb. 14, 1888.
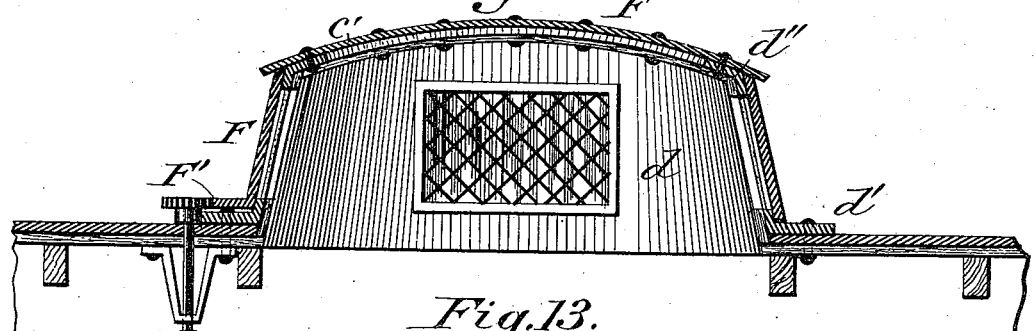
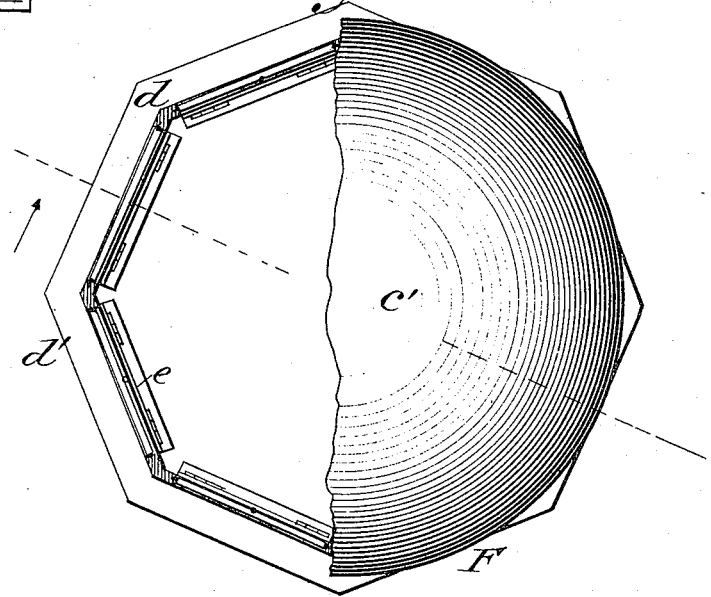
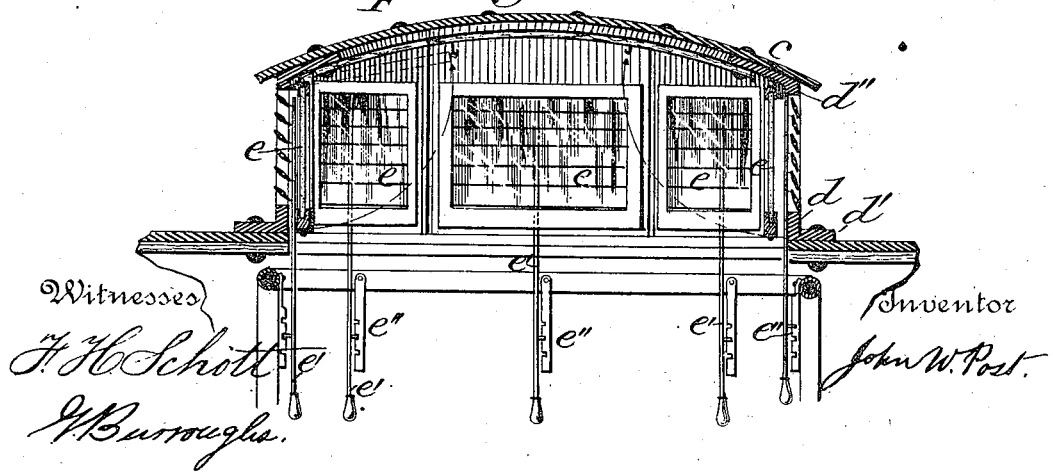
Witnesses
F. H. Schott
J. Burroughs.
Inventor
John W. Post.

(No Model.) 7 Sheets—Sheet 6.

J. W. POST.
EXPRESS CAR.

No. 377,774. Patented Feb. 14, 1888.

Witnesses
F. H. Schott
G. Burroughs

Inventor
John W. Post (No Model.) 7 Sheets—Sheet 7.
J. W. POST.
EXPRESS CAR.
No. 377,774. Patented Feb. 14, 1888.
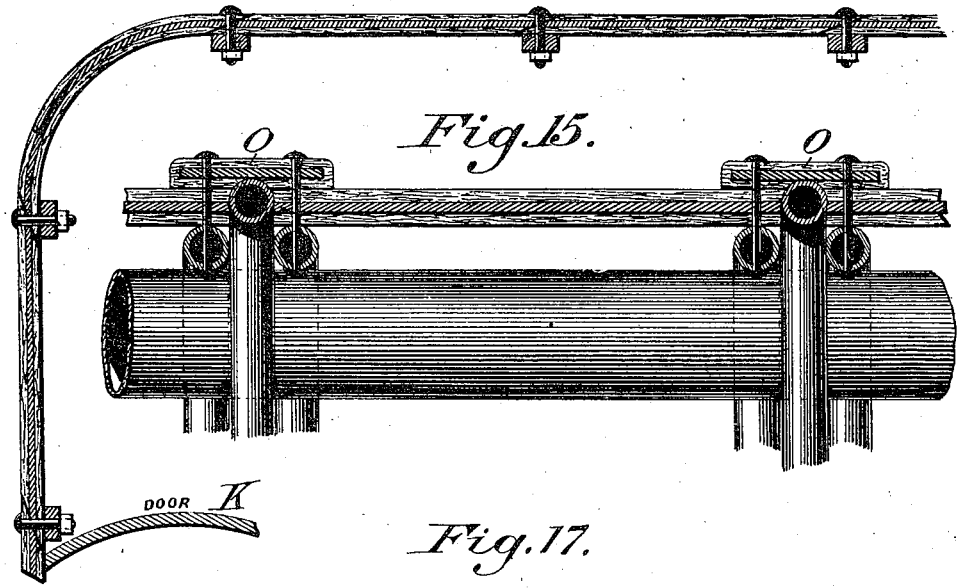

UNITED STATES PATENT OFFICE.

JOHN W. POST, OF NEW YORK, N. Y.

EXPRESS-CAR.

SPECIFICATION forming part of Letters Patent No. 377,774, dated February 14, 1888.

Application filed August 29, 1887. Serial No. 248,208. (No model.)

*To all whom it may concern:*

Be it known that I, JOHN W. POST, a citizen of the United States, residing at New York, in the county of New York and State of New York, have invented certain new and useful Improvements in Express-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in cars designed for the protection of lives and property upon railways, the object being to provide a car strong enough to withstand all concussions from collisions, derailment, or any other accident, and also to cover the car with such material as to resist the action of fire and shots from either rifles or revolvers in the hands of train-robbers or other desperadoes. While the principle may be applied to all classes of cars, the immediate object is to provide a car for the safe transportation of valuable express matter, bullion from the mines, coin from the different cities or mints, paymasters' supplies for the army, and for use as pay-cars on railroads. As this car possesses all the elements of a fortress on wheels, it will be peculiarly valuable while running over sections of the country sparsely settled and exposed to the lawless gangs who constantly infest such regions, as it will materially lessen the force of armed men necessary to protect such valuable trains. It will be valuable also as a protection from guerrillas during war-time. A few well-armed men within these moving fortresses, protected, as they are, by an impervious casement of steel pierced with automatically-closing port-holes, from which they can get the range of any man or other object outside the car without in the least exposing their own persons, will be more than a match for fully ten times their number of the outside or attacking party.

The entrance to these cars is by a rotating cylindrical door, which in no case will admit the passage of more than one person at a time, and may therefore, if it is desired, be used to assist in the capture of members of the attacking party, as such persons can be admitted singly to the car and effectually secured. The rotating door admitting but one person at a time prevents him from receiving assistance from his associates. The automatically closing port-holes, as seen by the drawings, are tubular inside, provided at the outer end with a ball-and-socket journal, which holds it within the casement or sides of the car and admits of its being turned in any direction, either for observation or for firing upon the outside enemy, and instantly thereafter the inside end may be dropped, which will bring the outside aperture within the socket which attaches it to the casement, thus effectually excluding all bullets fired by the attacking party. It will be apparent that the port-holes can be placed in both the top and bottom of the car, if thought desirable, so that in case it was thrown on its side the occupants could still operate against the enemy the same as if it stood in its proper position on the track.

Suitable turrets are extended above the roof of the car to admit light and air. These turrets may be easily and instantly closed in case of any attack from the outside, as they are provided with either heavy steel-slatted blinds or a rotating steel cylindrical casement. The roof is also supplied with suitable ventilators for the escape of the hot air from lamps or gas-burners, or foul air from other sources.

This car is also provided with an indestructible furnace for heating in winter, which is made sufficiently strong to resist all concussion of whatever nature, and is fastened firmly in position and made additionally secure by being surrounded by a heavy steel cage, which effectually prevents the throwing of either package or person against its heated surface in case of accident. Artificial light is provided by gas compressed within indestructible cylinders, also firmly secured in position in one corner of the car, from which cylinders it can be withdrawn at will by the occupants of the car. When used as a paymaster's car, suitable side windows are provided, through which to pass out checks or money. These windows are covered by heavy steel blinds, which can be instantly and securely closed from the inside in case of any sudden attack, these blinds being sufficiently strong to resist the action of any bullet.

It is apparent that these cars can be constructed in the ordinary form of common cars now in general use without departing from the principle of my invention. Still I prefer to build them on the indestructible principle shown in my patents dated September 25, 1883, and July 5, 1887.

Figure 9:
Figure 10:
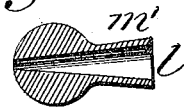
Figure 14:
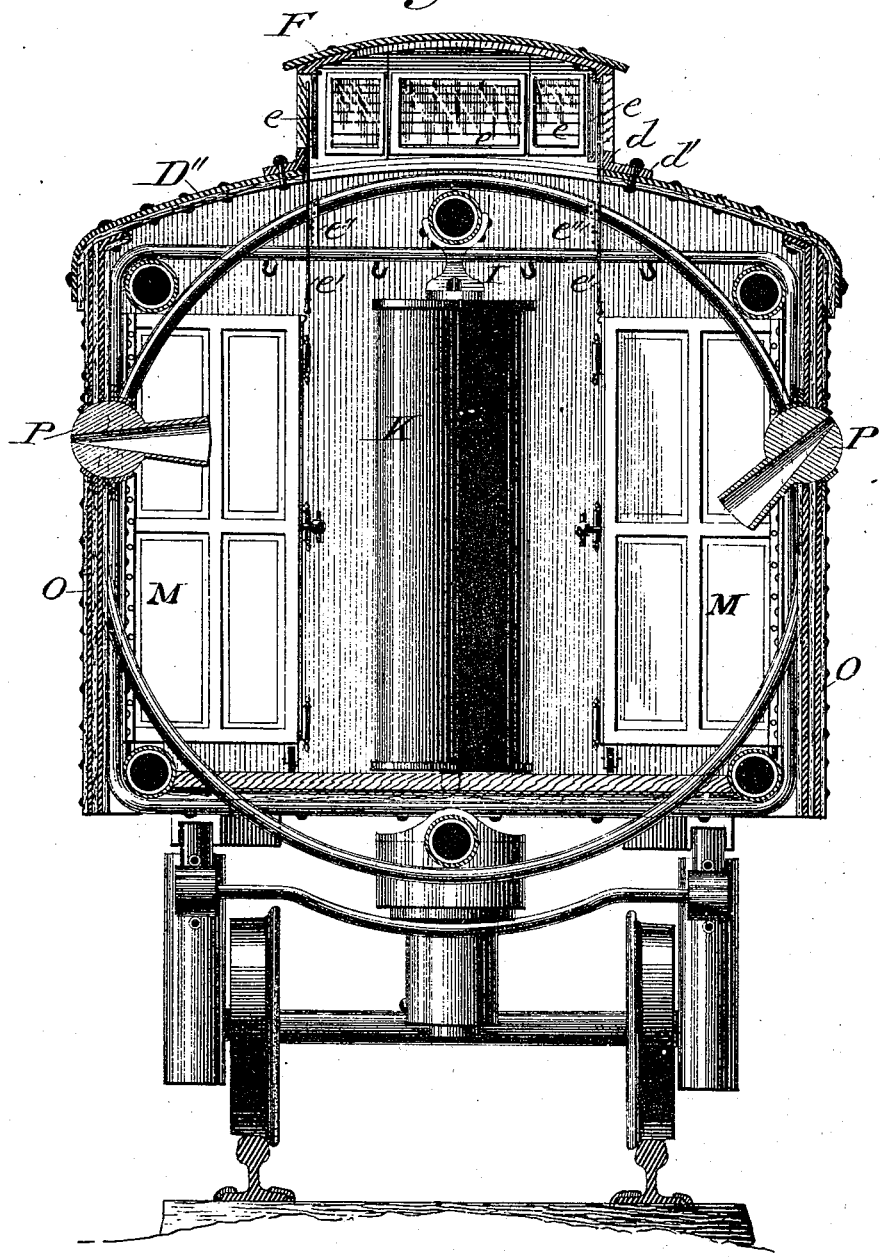

In the drawings forming a part of this application, in which similar letters of reference indicate like parts in the different figures, Figure 1 is a perspective view of the improved car, illustrating its outward appearance and the relative arrangement of the several doors and openings for the admission of light and air. Fig. 2 is a longitudinal vertical section showing the interior of the car and arrangement of the rotating doors at each end. Fig. 3 is a top view illustrating the method of constructing and guarding the entrance for air and light through the roof. Fig. 4 shows a horizontal section through the car, with the rotating cylindrical doors at either end, one opening on the platform, the other inside the car. Figs. 5 and 6 are enlarged sectional views of the cylindrical doors, one closed and locked against ingress to the interior of the car, the other with door opening into said interior. Fig. 7 is an enlarged horizontal section through the lock of the cylindrical door and post against which it shuts. Fig. 8 is a transverse vertical section through the car, showing the method of constructing and inserting the automatically-closing portholes in the sides thereof, also the means employed for pivoting and retaining in position the cylindrical doors. Fig. 9 shows one of the ports removed from the car. Fig. 10 is a longitudinal section of the same. Fig. 11 is a vertical transverse section through one of the turrets on top of the car, employed to give light and air into the interior. Fig. 12 is a similar view of a turret for the same purpose, but of slightly different construction. Fig. 13 is a top view, partly in section, of the turret shown in Fig. 12. Fig. 14 is a transverse vertical section of the car constructed with the improved tubular steel frame shown and described in my patents bearing date September 25, 1883, and July 5, 1887. Fig. 15 shows a section of one side of such a car, illustrating the manner in which the outside coverings of the car are attached to the frame. Fig. 16 illustrates the method of forming the joints between the several parts of such coverings. Figs. 17 and 18 are front and sectional views of the small safes or lockers arranged upon the sides of the car for the reception of small parcels or frail packages.

In the construction of this car I may employ the ordinary timber framing, composed of the sills A A, uprights B B, and rafters or roof-supports C C. As the car is heavy and may be expected to sustain more than the ordinary shocks to which a car is subjected, the timber of this frame should be considerably heavier than usual, and together with the other woodwork of the car should be submitted to a bath in a solution of alum or some other mineral of such a nature that when the wood becomes thoroughly impregnated with it it will part with its inflammable condition, becoming almost incombustible. In covering this frame I prefer to first secure to the outer side of the uprights a layer or sheeting of boards, $a\ a$, treated in the mineral solution, as above stated. Outside of this covering $a$ is placed the metallic sheet D, preferably of hardened steel and of such thickness as to be impenetrable by ordinary rifle-bullets, and outside of this metallic layer is placed the covering $a'$, which forms the outer surface of the sides of the car, all three layers being secured together and to the car-frame by suitable bolts and rivets. Instead of using prepared wood for the sheathing and outer surface, I may use sheets of asbestus board, which, when properly prepared, possesses all the requisites of strength and incombustibility. The ends of the car, as well as the sides, are incased with this triple covering, excepting at those points where the necessary openings for ingress and egress and for the admission of air and light are made.

The floor of the car I prefer to make as follows: A heavy steel plate, D', in as few pieces as possible, is first laid upon the sills and properly secured thereto. Over this plate is placed the floor E, of prepared wood or other suitable material, and secured to the metallic floor-plate by screws or rivets, thus rendering it easily replaced by a new one when necessary.

The upper ends of the metallic side plates, D, are bent over so as to form a flange, $b$, extending a short distance upon the rafters C, to the ends of which they are firmly secured, thus greatly strengthening the car at this point and allowing the construction of the car without the use of the plate commonly used to connect the tops of the uprights of the side frame and support the rafters. Overlying this flange $b$ and resting upon the rafters is a layer of sheathing, $b'$, which is in turn covered by the metallic plate D'', forming the outer covering of the roof. This plate is of sufficient thickness to be, like the sides, impenetrable by bullets, and extends at both ends of the car over the platform, forming an efficient roof over the same. Its outer margin all around is bent down, so as to form a downwardly-projecting flange, $c$, which supports and stiffens that part of the roof projecting over the platform, and, being riveted to the sides of the car, causes the sides and top to be united as one piece, thus adding greatly to the strength of the structure.

Mounted upon the roof are the two turrets F F, for the purpose of giving light and ventilation to the interior of the car. These turrets, as shown in Figs. 11 and 12, are formed from a ring of sheet metal, $d$, bent into either a circular or polygonal form and provided at its lower edge with an outwardly-projecting flange, $d'$, which is riveted or bolted to the car-top, and its upper edge with an inwardly-projecting flange, $d''$, to which the dome-shaped cover c' is securely riveted. The sides of these turrets are pierced with rectangular openings, which are closed, when desired, by metallic slats e e, pivoted at each end in the sides of the openings and connected by staples with the handled rods e' e', passing down into the car, each rod having a projecting pin which engages with the notches in the pendent bars e'', so that the occupant of the car can open or close the openings in the turrets at will by manipulating the rods e'. When the circular turret is used, instead of the pivoted slats and their operating mechanism for controlling the openings in the turret, I inclose the same in a sleeve, F', that turns loosely upon the turret and has openings corresponding with those therein. A projecting flange at the bottom of this sleeve is provided with teeth which engage with a pinion mounted upon the upper end of the shaft $f$, which passes through the roof of the car, its lower end being provided with a cranked handle, $f$, within reach of the occupant of the car, by the rotation of which handle the sleeve is turned to cover or uncover the openings in the turret.

Additional projections, F''', at either end of the car cover openings through the roof for the purpose of ventilation, and may also be used as a location for the lights by which the interior of the car is illuminated by night.

Other openings or windows, as $g g$, are formed in the sides of the car, and may be more or less in number, according to the especial purpose to which the car is applied. In the ordinary express car there would be little use for these windows, except for the purpose of ventilation; but when the car is used for a paymaster's car they become useful as furnishing an opening through which the money or checks may be passed to the outside parties waiting to receive it. These windows may be protected by a blind formed of metallic slats, as shown, or by a sliding metal shutter.

The ordinary sliding doors, G G, are placed one upon each side of the car, for the purpose of loading and unloading freight. The only difference between these doors and those used upon the common express car consists in the fact that these doors on my car are formed from heavy steel plates and are provided with extra locks and bolts upon the inside.

In order to obtain access to the car from the platform, door-openings H H are formed, one in each end of the car. The doors which close these openings consist of a hollow metallic cylinder, K, closed at both top and bottom, and provided with a step or pivot, $h$, at the bottom and a pintle, $h'$, at the top. The step rotates upon a suitable support in the car floor, and the pintle revolves in the bracket I, secured to the end of the car above the door. An opening, H', corresponding in dimensions with the opening H in the end of the car, is formed in one side of the cylindrical door K, and one side of this opening in said door is provided with a flange, K', projecting radially from said opening, (see Figs. 5 and 6,) which, when the openings in the end of the car and door register, rests against the beveled edge of the side of said opening, and is provided with a spring-lock, the bolt of which enters the recess formed in the strip J, secured by rivets to the metallic end sheets, D, of the car. (See Fig. 7.) When the cylindrical door is secured in this position, the opposite edge of the opening in said door comes in contact with the sheet of metal at I' upon the opposite side of the door, so that free ingress is had from the platform of the car to the interior of the cylinder. Now, if this cylinder be turned until the flange K' strikes the beveled door-jamb at I', it is evident that the opening H in the end of the car will be closed by the body of the cylinder, and the opening H' in said cylinder will be inside the car, and that a person in the cylinder may step out of the same into the car, and in this position the cylinder may be locked by a bolt, $i$, secured to the outside of said cylinder and shooting into a suitable aperture in the floor. To go from the car to the platform this operation is reversed. The person wishing to leave the car steps into one of the cylinders, withdraws the bolt $i$, and swings the cylinder around until its opening registers with that in the end of the car.

The devices for heating the car which I prefer consist of the hot-air heater L, placed in one corner and firmly secured therein against displacement, and further secured from injury in case of accident or from inflicting injury on any person or article which might be thrown against it by a strong steel cage, within which said heater is inclosed. Other means of heating the car may be employed—as, for instance, when the car-frame is composed of steel tubing instead of wood, these tubes may be connected with a heating apparatus upon the tender, which will furnish a full supply of hot air for heating all the cars of the train.

Suitable safes, as M M, are built or securely fastened to the works of the car and serve as a receptacle for money and valuable packages, their attachment to the car preventing their removal by robbers to save the time ordinarily required in opening them, which might give the passengers and train-hands time to recover from their shock and to make an effectual resistance to the operations of the robbers, who are generally few in number.

In order to give the persons in the express car an opportunity of taking up the offensive against an attacking party, I provide the sides and ends as well as the bottom and top of the car, if desired, with a series of port-holes, through which the inmates of the car may direct a fire from rifles or revolvers upon the attacking party with perfect safety to themselves.

In Figs. 8, 9, and 10 I have shown the manner of constructing these parts and their fittings, which is as follows: The opening cut in the car is circular and of sufficient diameter to receive the globular portion $m$ of the port-stopper P. A conical cylindrical part, $m'$, projects from this globular portion inside the car, and through both passes the funnel-shaped opening $l$, large at its inner end, where it opens into the car, and of just sufficient size at the other to allow the muzzle of the fire-arm to pass. In order to secure these port-stoppers in place, flanged collars $n\ n'$ are riveted or otherwise secured to the outer and inner sides of the car-wall around the openings which receive the port-stoppers. The flanges of these collars are curved, so that they partly inclose the globular part $m$ of the stopper, forming therewith a ball-and-socket joint. It is evident that the weight of the inwardly-projecting part $m'$ of the port-stopper will cause the same to automatically assume an inclined position, with the small outer end of the funnel-shaped opening $l$ covered by the projecting flange of the collar $n$ upon the outside of the car, thus making it impossible for a bullet to enter the car through the port when the latter is not in use; but when in use the muzzle of the fire-arm may be inserted into the opening $l$ and the port-stopper turned in any desired position, the ball-and-socket joint giving as great a range as though the port were wholly open to the full extent of its diameter. By placing these ports in the ends of the car and the car next to the engine, its occupants are able to protect the engineer and fireman from interference by train-robbers, strikers, or other unauthorized parties, and by placing a number of them in the roof and floor its occupants would be still able to defend it if it were thrown from the track and lying upon its side.

In the foregoing description I have described the car as constructed with an ordinary frame of wood; but I prefer to construct the same with a tubular steel frame, such as is described in my Patent No. 365,938. When using this frame, the outside covering will be secured to the same by a system of clamps, O O, arranged as shown in Fig. 15, and the several sheets of metal and its outer and inner covering forming the walls of the car may be united beneath these by means of a scarfed joint, as shown in Fig. 16, and with this improved car may be used the metallic tubular car-truck described in the above-named patents, the whole forming an incombustible and almost indestructible car, capable of being defended by a single person against the attack of a band of desperate men for such a length of time as to allow others to come from a distance to his aid.

For the better protection of delicate and frail packages of express matter I provide the sides of the cars with a series of divided shelves, Q, forming pigeon-holes or small safes, with independent doors, in which receptacles said packages can be securely transported without the possibility of being crushed or broken, as is too frequently the case when thrown promiscuously into the body of the car, and as a convenience in finding such packages the card bearing the name and address of the consignee may be attached to the outside of said door, thus saving much time and annoyance.

In order to afford the express-messenger a chance for rest, a bed, as R, (see Fig. 2,) may be placed in the car, upon which he may lie down whenever the nature of his duties will permit, thus obtaining the rest needed upon long routes.

For the purpose of lighting the car a cylinder, T, may be securely bolted to the floor, so that it cannot be easily displaced, and this cylinder filled with compressed gas, which gas may be conducted through suitable pipes and burners to those places in the car needing to be lighted by artificial means.

Having thus described my invention, I claim as new and desire to secure by Letters Patent the following:

1. A car provided with a metallic covering of such thickness and material as to resist the impact of rifle-shot and provided with platforms and rotating hollow cylindrical end doors opening from said platform to the interior of the car, as set forth.

2. A car provided with end platforms and hollow cylindric rotating doors adapted to give entrance and exit between the interior of the car and said platforms, as set forth.

3. A car provided with hollow cylindrical rotating doors turning upon pivots at top and bottom and provided with an opening in one side to allow entrance and exit to and from the interior of said door, substantially as set forth.

4. A car provided with self-closing ports, said ports having an opening through them and socketed in the walls of the car, substantially as described.

5. As an improvement in railway-cars, a car having a sheet of metal of sufficient thickness to resist the impact of a rifle-ball inclosed within the thickness of its outer wall, in combination with a series of automatically-closing ports inserted in said wall, as set forth.

6. As an improvement in railway-cars, the combination of the car-walls inclosing a sheet of metal, the automatically-closing ports inserted in said walls, and the rotating car-doors, all adapted and arranged to give protection to the persons and valuables within said car, as specified.

7. As an improvement in railway-cars, the combination of the perforated car-walls, the flanged collars secured to said walls, and the ports provided with a globular outer end adapted, in connection with the car-walls and flanged collars, to form a ball-and-socket joint, as and for the purpose set forth.

8. A metallic-cased car, in combination with turrets for the admission of light projecting above the roof of said car and provided with metallic shutters adapted to securely close the openings in the same, substantially as set forth.

9. A car provided with turrets F, projecting above its roof, the openings in said turrets being closed by pivoted metal slats $e$, attached to a handled rod, $e'$, projecting downward within the car, and provided with stops by which the position of the slats may be controlled, as specified.

10. As an improvement in safety-cars for express matters, a metal-cased car provided with guarded entrances, the turrets F, for the admission of light, and the turrets F''', for the purpose of ventilation, arranged upon the car-roof, as specified.

11. As an improvement in the construction of safety-cars, the combination, with a tubular car-frame, of the clamps O and side walls of the car, said clamps being adapted to secure the side walls to the frame, as specified.

12. As an improvement in safety-cars, the combination, with the hollow cylindric rotating doors provided with flange K', of the beveled casing having covering-strip J riveted thereto, and a suitable lock for securing the flange K' to said strip when desired, substantially as set forth.

In testimony whereof I affix my signature in presence of two witnesses.

JOHN W. POST.

Witnesses:
ROBINSON WHITE,
M. T. E. CHANDLER.